UNITED STATES PATENT OFFICE.

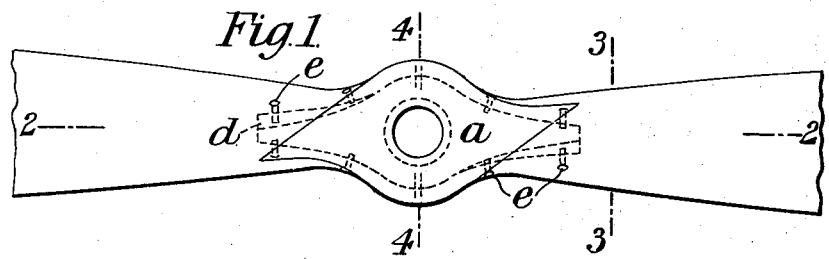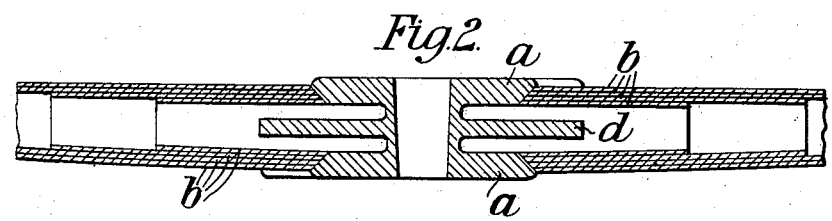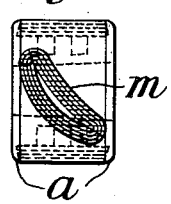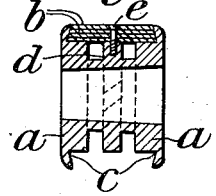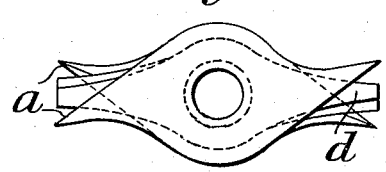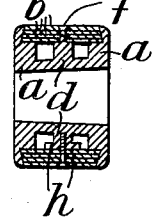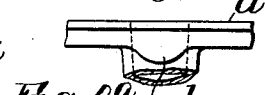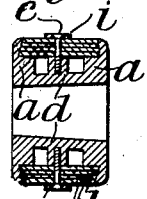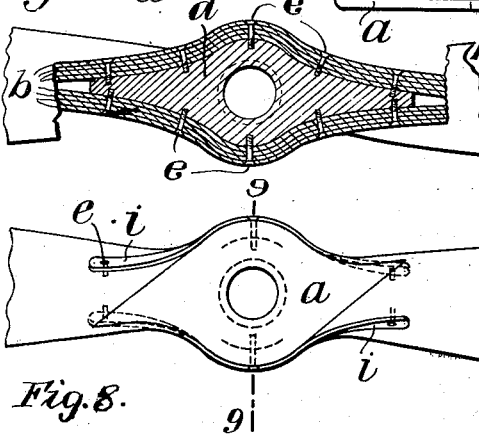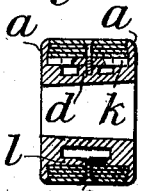

HENRY LEITNER, OF WESTMINSTER, LONDON, ENGLAND.

SCREW-PROPELLER.

1,328,004.  Specification of Letters Patent.  Patented Jan. 13, 1920.

Application filed March 25, 1919. Serial No. 285,050.

*To all whom it may concern:*

Be it known that I, HENRY LEITNER, a subject of the King of Great Britain, residing at 3 Victoria street, Westminster, London, England, have invented new and useful Improvements in Screw-Propellers, of which the following is a specification.

My invention relates to improvements in screw propellers chiefly designed for use with aircraft, and to the class of propellers in which the blades are hollow and are made of sheet metal plates welded or otherwise suitably joined at the edges, attention being directed to my co-pending application filed Mar. 25, 1919, and bearing Serial No. 285,051. In my co-pending application I have described and claimed a propeller having hollow blades formed of sheet metal and having gaps adjacent the hub, and a hub composed of a central tube which extends through the hub portion of the propeller and has end plates provided with horns which fill the gaps and form power transmitting means between the hub and blades. The blades shown in my co-pending application are also provided with internal laminal strengthening means.

According to the invention my improved screw propeller comprises a sheet metal sheath, preferably with internal laminæ or liners, which extends across a hub composed of a central tube having end plates or flanges, furnished with horns which serve as power transmitting filling pieces for the gaps in the sheath adjacent to the said hub. The end plates are made with rabbets or grooves for taking the thrust of the blades, the said grooves having their upright faces extending inward or toward one another so as to form under-cut recesses or grooves, thus affording a grip on the sheet metal laminæ. Moreover, the flanges may be furnished with semi-elliptical or other shaped lugs or extensions which project inward so as to form further supports for the metal laminæ constituting the blades.

In order to afford still greater support and better security for the sheet metal of the blade so as better to transmit the power from the boss and still further to relieve the edge welding of the metal sheets from stresses, I sometimes provide one or more supplementary pieces of metal very similar to the flanges or end plates and also following for some distance the contour of the sheet metal blades but without any rabbet and securely fixed between the said flanges or end plates so that the sheet metal out of which the blades are formed rests on it or them.

As in the construction of propellers of the type above described there is a liability of a slight waving or buckling distortion of the face of the blade due to the heat imparted to the metal in the welding and annealing operations, I propose to make the said face or side of the propeller of a slightly concave form in order to overcome this defect.

To enable the invention to be fully understood, I will describe it by reference to the accompanying drawings, which illustrate by way of example how it can be carried into practice, and in which:—

Figure 1 is a face view of a portion of a propeller.

Figs. 2, 3 and 4 are sections on the lines 2—2, 3—3, and 4—4, respectively of Fig. 1.

Fig. 4ª is a longitudinal median section of the propeller.

Fig. 5 is a face view of the boss detached, and

Fig. 6 is a plan of the same.

Fig. 6ª is a plan of a portion of a boss illustrating a modification.

Fig. 7 is a sectional view of a boss illustrating a modification, and

Fig. 8 is a face view similar to Fig. 1 but illustrating a further modification.

Fig. 9 is a section on the line 9—9, Fig. 8.

Fig. 10 is a view similar to Fig. 9 but showing variations.

$a$, $a$ indicate the ends plates or flanges of the propeller hub, which are integral with the central tube and $c$, $c$ are the under-cut recesses or grooves formed on the faces of said flanges, as shown in Fig. 4, and into which the plates or sheath $b$ forming the propeller blades and which extend across the hub, enter.

In laying the blade plates $b$ in position it will be necessary slightly to buckle them to insert them between the flanges, or else, after the plates have been laid in position, to close in the flanges against the edges of the plates. In either case the effect will be to clip the plates $b$ on to the boss so that the liability of the plates leaving the same will be obviated.

In Fig. 6ª, $a^1$ indicates a lug or extension with which the flanges $a$ may be furnished to form further supports for the plates $b$.

$d$ indicates the supplementary flange inserted between the two end plates $a$ of the boss and which is so shaped that the blade plates $b$ as they are passed across the hub will lie upon the surface of the said supplementary flange, as clearly shown in Figs. 1 and 4, whereby the said supplementary flange will act as a driving piece for the blades. Screws $e$, are advantageously passed through the sheet metal laminæ into the driving piece $d$ so that their heads are flush with the surface of the blades and may, if desired, be welded in. Instead of the screws $e$, studs $f$ may be formed integral with the supplementary plate $d$, as shown in Figs. 6 and 7, and the laminæ $b$ of the blades correspondingly perforated, the studs being finally riveted over on to the outer surfaces of the blades and welded.

If desired, in addition to the studs $f$, lateral studs $g$, as indicated by dotted lines in Fig. 6 or broader lateral projections as indicated at $h$ in the said figure and in Fig. 7, may be used to form further supports for the plates $b$.

As the welding of the screws, nuts or studs, might cause a slight weakening of the laminæ, I prefer to insert between the heads of such screws, stud-heads or nuts, a strip of metal $i$, as shown in Figs. 8 and 9, the said screws, stud-heads or nuts being welded to the said strip.

In another form of construction transverse strips or bars $k$, Fig. 10, of metal may be placed and secured between the end flanges $a$, such transverse strips also passing across the supplementary flange $d$; or the laminæ $b$ may be secured directly to these transverse strips, in which case the supplementary flange may be dispensed with, as indicated at $l$ in the lower part of Fig. 10, such transverse pieces being integral with the end flanges $a$.

As in the construction of propellers of the type above described there is a liability of a slight waving or buckling distortion of the face of the blade due to the heat imparted to the metal in the welding and annealing operations, I propose, according to my present invention, to overcome this defect by making the faces of the blade, which have heretofore been flat, slightly concave in form as shown at $m$ in Fig. 3. Such a concave face does not buckle or wave as the flat surface would, owing to the fact that the expansion and contraction of the metal due to the heat of the welding and annealing operations merely have the effect of slightly altering the curvature of the said face.

Having now particularly described and ascertained the nature of my said invention and in what manner the same is to be performed, I declare that what I claim is:—

1. A screw propeller comprising a sheet metal sheath and a hub across which the said sheath extends, the said hub having end plates formed with under-cut recesses, the walls of which grip the said sheet metal sheath, substantially as described.

2. A screw propeller comprising a sheet metal sheath and a hub across which the said sheath extends, the said hub having end plates formed with under-cut recesses, the walls of which grip the said sheet metal sheath, and projecting lugs extending inwardly from the end pieces and supporting the sheath.

3. A screw propeller comprising a sheet metal sheath and a hub across which the said sheath extends, the said hub having end plates and a supplementary driving plate between the said end plates to which supplementary plate the sheath is secured, substantially as described.

4. A screw propeller comprising a sheet metal sheath and a hub across which the said sheath extends, the said hub having end plates and transverse bars on which the sheath rests and to which it is secured, substantially as hereinbefore described.

HENRY LEITNER.